US012560577B2

(12) United States Patent
Emadi et al.

(10) Patent No.: US 12,560,577 B2
(45) Date of Patent: Feb. 24, 2026

(54) QCM WITH ELECTRODE CONFIGURATION BASED ON DISTRIBUTION OF AREA FOR IMPROVING MASS SENSITIVITY (DAIS)

(71) Applicant: University of Windsor, Windsor (CA)

(72) Inventors: Arezoo Emadi, Windsor (CA);
Siddharth Swaminathan, Chennai (IN)

(73) Assignee: University of Windsor, Windsor (CA)

( * ) Notice: Subject to any disclaimer, the term of this patent is extended or adjusted under 35 U.S.C. 154(b) by 368 days.

(21) Appl. No.: 18/123,654

(22) Filed: Mar. 20, 2023

(65) Prior Publication Data

US 2023/0296564 A1 Sep. 21, 2023

Related U.S. Application Data

(60) Provisional application No. 63/321,848, filed on Mar. 21, 2022.

(51) Int. Cl.
*G01N 29/02* (2006.01)
*G01N 29/24* (2006.01)

(52) U.S. Cl.
CPC ....... *G01N 29/022* (2013.01); *G01N 29/2443* (2013.01); *G01N 2291/014* (2013.01); *G01N 2291/021* (2013.01)

(58) Field of Classification Search
CPC .............. G01N 29/022; G01N 29/2443; G01N 2291/014; G01N 2291/021; G01N 29/036; G01N 29/222
See application file for complete search history.

(56) References Cited

U.S. PATENT DOCUMENTS

| | | | |
|---|---|---|---|
| 7,036,375 B2 | 5/2006 | Nozaki | |
| 10,184,845 B2 | 1/2019 | Tadigadapa et al. | |
| 2009/0293590 A1* | 12/2009 | Zeng .................... | G01N 29/022 |
| | | | 73/24.06 |
| 2013/0017567 A1* | 1/2013 | Lu ......................... | G01N 29/022 |
| | | | 977/789 |
| 2018/0209836 A1* | 7/2018 | Lu ........................... | C12M 1/34 |
| 2021/0102919 A1* | 4/2021 | Schlicke ............ | G01N 29/4436 |
| 2023/0152320 A1* | 5/2023 | Pan .................. | G01N 33/56911 |
| | | | 435/5 |

OTHER PUBLICATIONS

A. Joseph, "Design and Analysis of High-Frequency Quartz Crystal Microbalance Sensor Array with Concentric Electrodes and Dual Inverted Mesa Structure for Multiple Gas Detection" (2019). Electronic Theses and Dissertations. 8168.
H. Nazemi, "A Miniaturized Chemical Vapor Detector Using MEMS Flexible Platform" (2019). Electronic Theses and Dissertations. 8174.

(Continued)

*Primary Examiner* — Francis C Gray
(74) *Attorney, Agent, or Firm* — Stites & Harbison, PLLC; David W. Nagle, Jr.

(57) ABSTRACT

In a preferred embodiment, there is provided a quartz crystal microbalance comprising a pair of electrodes and a quartz crystal disposed therebetween, one said electrode operable as a sensing electrode for interacting with an analyte, wherein said sensing electrode comprises an array of sensing electrode members positioned within a sensing electrode surface portion on the quartz crystal.

19 Claims, 11 Drawing Sheets

Sensing layer
Top electrode
Quartz crystal
Bottom electrode

(56) References Cited

OTHER PUBLICATIONS

H. Nazemi et al., "Mass sensors based on capacitive and piezoelectric micromachined ultrasonic transducers—CMUT and PMUT," Sensors (Switzerland). 2020, doi: 10.3390/s20072010.

A. Mujahid, A. Afzal, and F. L. Dickert, "An overview of high frequency acoustic sensors—QCMs, SAWs and FBARs—chemical and biochemical applications," Sensors (Switzerland). 2019, doi: 10.3390/s19204395.

A. A. Vives, Piezoelectric transducers and applications. 2008.

G. Sauerbrey, "Verwendung von Schwingquarzen zur Wägung dünner Schichten und zur Mikrowägung," Zeitschrift für Phys., 1959, doi: 10.1007/BF01337937.

X. Huang, Q. Bai, J. Hu, and D. Hou, "A practical model of quartz crystal microbalance in actual applications," Sensors (Switzerland), vol. 17, No. 8. MDPI AG, Aug. 3, 2017, doi: 10.3390/s17081785.

H. Jiang, "Finite element analysis on electrode structure of QCM," in 2009 Chinese Control and Decision Conference, CCDC 2009, 2009, doi: 10.1109/CCDC.2009.5192819.

X. Huang, W. Pan, J. Hu, and Q. Bai, "The Exploration and Confirmation of the Maximum Mass Sensitivity of Quartz Crystal Microbalance," IEEE Trans. Ultrason. Ferroelectr. Freq. Control, vol. 65, No. 10, pp. 1888-1892, 2018, doi: 10.1109/TUFFC.2018.2860597.

D. Zhang, D. Wang, P. Li, X. Zhou, X. Zong, and G. Dong, "Facile fabrication of high-performance QCM humidity sensor based on layer-by-layer self-assembled polyaniline/graphene oxide nanocomposite film," Sensors Actuators, B Chem., vol. 255, pp. 1869-1877, Feb. 2018, doi: 10.1016/j.snb.2017.08.212.

A. Joseph, A. Emadi, High Frequency Dual Inverted Mesa QCM Sensor Array With Concentric Electrodes, IEEE Access, 8 (2020): 92669-92676.

* cited by examiner

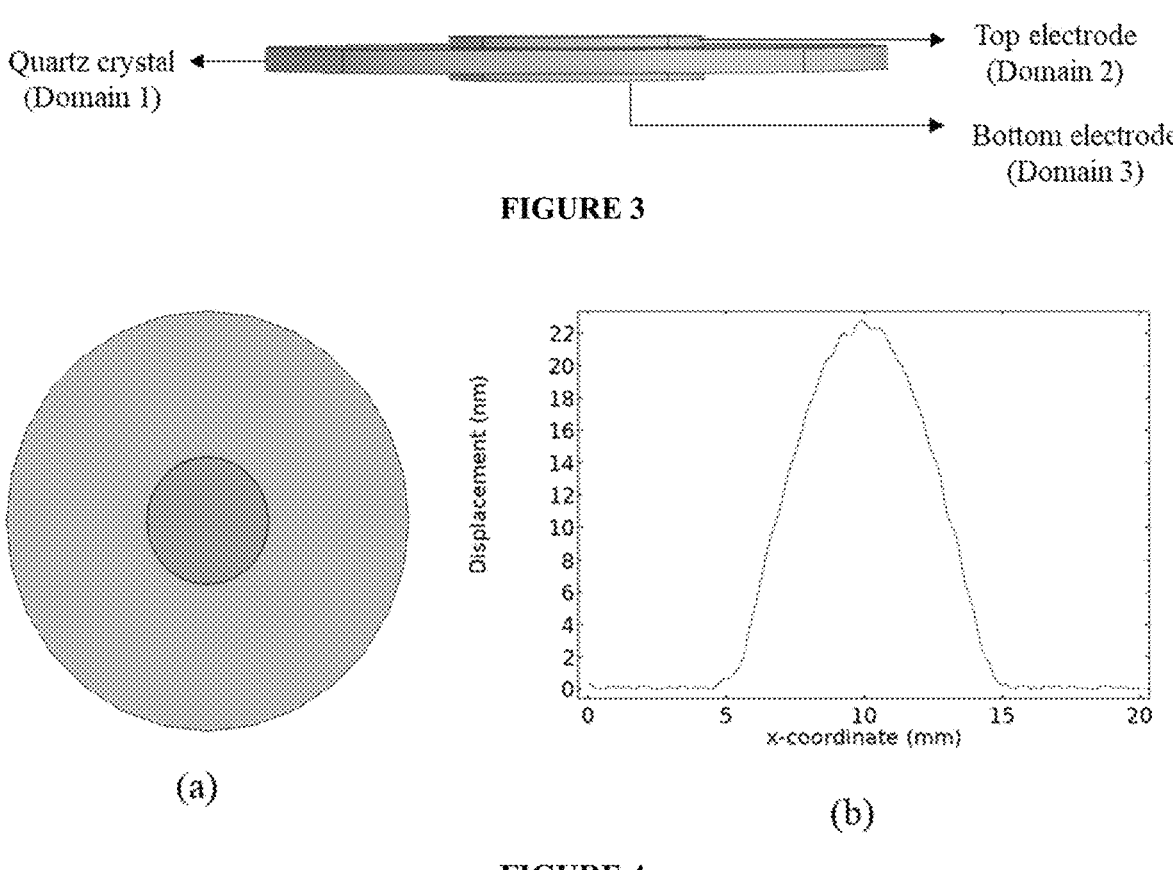
Quartz crystal (Domain 1)
Top electrode (Domain 2)
Bottom electrode (Domain 3)
FIGURE 3
(a)
(b)
FIGURE 4
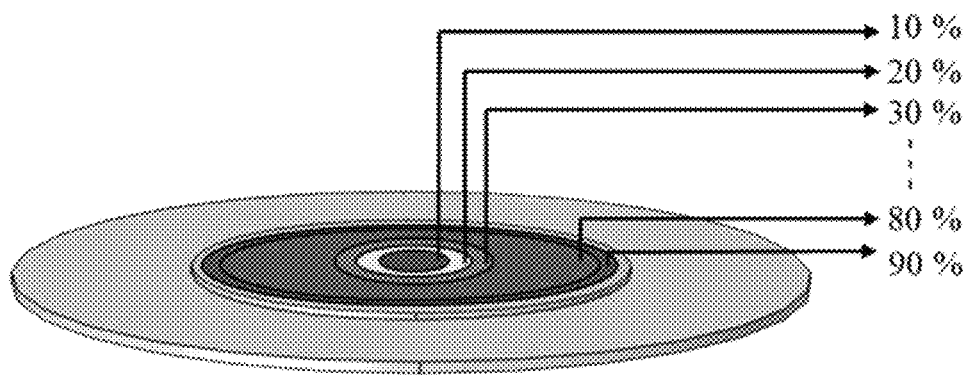
Mass Loading Area Coverage
10 %
20 %
30 %
⋮
80 %
90 %
FIGURE 5

Electrode Radius a) 1mm b) 1.5 mm c) 2.5 mm d) 4.25 mm e) 5.5 mm (a)                           (b)

(a)              (b)              (c)              (d)

(a)              (b)

QCM WITH ELECTRODE CONFIGURATION BASED ON DISTRIBUTION OF AREA FOR IMPROVING MASS SENSITIVITY (DAIS)

RELATED APPLICATIONS

This application claims the benefit under 35 U.S.C. § 119(e) to U.S. Provisional Patent Application Ser. No. 63/321,848 filed 21 Mar. 2022, the entire contents of which are incorporated herein by reference.

SCOPE OF THE INVENTION

The present invention relates to a quartz crystal microbalance having a sensing electrode with an array of sensing electrode members, and which may permit improved mass sensitivity, as well as reduced mass loading area.

BACKGROUND OF THE INVENTION

The quartz crystal microbalance (QCM) is a widely used device for gravimetric sensing applications in liquid and gas phase. This device operates on the fundamental principle of a change in resonant frequency due to an added mass which is used to detect analytes in gas sensing applications. Its structure consists of an AT cut quartz crystal as the active piezoelectric layer. As seen in FIG. 1, this AT cut quartz crystal is sandwiched between top and bottom electrodes to which an alternating voltage is provided during its operation. The top electrode functions as the sensing electrode while the bottom electrode acts as the reference electrode.

The QCM utilizes the inverse piezoelectric effect for mass sensing, where the quartz crystal undergoes a mechanical stress and vibrates on the application of an electric field. The mechanical oscillating frequency of the QCM produced in response to the applied voltage is known as its resonant frequency. The fundamental resonant frequency $f_0$ is be represented by equation (1) below, where $\mu_q$ is the shear modulus of the quartz crystal, $\rho_q$ is the density of the quartz crystal, and $t_q$ is the thickness of the quartz.

$$f_0 = \frac{\sqrt{\mu_q / \rho_q}}{2t_q} \tag{1}$$

On analyte interaction, the mass loading area present on top of the sensing electrode undergoes mass loading. The addition of mass on the QCM due to analyte interaction causes a shift in the resonant frequency, and this is governed by the Sauerbrey's equation (2):

$$\Delta f = -\frac{2f_0^2}{A\sqrt{\rho_q \mu_q}}\Delta m \tag{2}$$

where $f_0$ is the fundamental resonant frequency, A is the active quartz area sandwiched between the electrodes, and $\Delta m$ is the change in mass on the QCM surface due to the analyte absorption.

The ability of the QCM to detect surface mass changes on analyte interaction is termed as the mass sensitivity. The mass sensitivity 'S' is defined as the ratio of change in resonant frequency of the QCM for an added mass and can be represented by the following expression:

$$S = \frac{\Delta f}{\Delta m} \tag{3}$$

The radial distribution of mass sensitivity across the QCM is used to depict the sensing performance across the QCM surface and is termed as the uniformity distribution. The publication "A practical model of quartz crystal microbalance in actual applications," *Sensors (Switzerland)*, vol. 17, no. 8. MDPI AG, 3 Aug. 2017, doi: 10.3390/s17081785 to Huang defined a model to represent the uniformity distribution as a function of particle displacement amplitude along the surface of the QCM and is represented in the equation (4), $$S_{f(r,\theta)} = -\frac{|A(r,\theta)|^2}{2\pi \int_0^\infty r|A(r,\theta)|^2 dr} \times C_f \tag{4}$$

Where $S_f(r, \theta)$ is the radial mass sensitivity function, Cf is the Sauerbrey's sensitivity constant (17.7 ng·cm²/Hz), and A(r, θ) is the particle displacement amplitude, where r is the radial distance from the center.

SUMMARY OF THE INVENTION

A possible non-limiting object of the present invention is to provide a quartz crystal microbalance for gravimetric sensing, and which is provided with a quartz crystal and a pair of electrodes constructed to possibly permit-increased mass sensitivity without necessarily increasing mass loading area.

Another possible non-limiting object of the present invention is to provide a quartz crystal microbalance having a sensing electrode with an array of sensing electrode members arranged to possibly permit increased resonance frequency shift for a given added mass by, for example, utilizing a localized energy trapping.

In one simplified aspect, the present invention provides a quartz crystal microbalance comprising a pair of electrodes and a quartz crystal disposed therebetween, one said electrode operable as a sensing electrode for interacting with an analyte, wherein said sensing electrode is other than a circular sensing electrode.

In one aspect, the present invention provides a quartz crystal microbalance comprising a pair of electrodes and a quartz crystal disposed therebetween, one said electrode operable as a sensing electrode for interacting with an analyte, wherein said sensing electrode comprises an array of sensing electrode members positioned within a sensing electrode surface portion on the quartz crystal.

In another aspect, the present invention provides a quartz crystal microbalance comprising a pair of electrodes and a quartz crystal disposed therebetween, one said electrode operable as a sensing electrode for interacting with an analyte, wherein said sensing electrode comprises an array of sensing electrode members positioned within a sensing electrode surface portion on the quartz crystal, and wherein the sensing electrode members comprise a central sensing electrode member and one or more peripheral sensing electrode members, said central sensing electrode member being for positioning at or proximal to a center of the sensing electrode surface portion, and the one or more peripheral sensing electrode members being for placement around the central sensing electrode member.

In yet another aspect, the present invention provides a quartz crystal microbalance comprising a pair of electrodes and a quartz crystal disposed therebetween, one said electrode operable as a sensing electrode for interacting with an analyte, wherein said sensing electrode comprises an array of sensing electrode members arranged on the quartz crystal.

In yet another aspect, the present invention provides a quartz crystal microbalance comprising sensing and reference electrodes and a generally planar quartz crystal having opposed first and second surfaces respectively for contacting the sensing and reference electrodes, the sensing electrode being for interacting with an analyte, and the sensing and reference electrodes being generally aligned in a direction along a depth of the quartz crystal, wherein the sensing electrode comprises an array of sensing electrode members arranged on the quartz crystal, and wherein the sensing electrode members comprise a central sensing electrode member and one or more peripheral sensing electrode members for placement around the central sensing electrode member.

In one embodiment, the quartz crystal has a generally or substantially circular shape having a pair of opposed electrode surfaces each for contacting a respective one of the electrodes, said sensing electrode surface portion being located at or proximal to a center of one said electrode surface. In one embodiment, the quartz crystal has a generally discoid shape, and the sensing and reference electrodes are located at or proximal to a center of the quartz crystal. It is to be appreciated that the quartz crystal is not strictly restricted to having a generally or substantially circular, discoid or other shape, provided that quartz crystal permits use as a resonator in the operation of the quartz crystal microbalance. In one embodiment, the quartz crystal has a radius between about 1 mm and about 100 mm, between about 2 mm and about 50 mm, between about 5 mm and about 20 mm or about 10 mm. In one embodiment, the quartz crystal has a depth or thickness between about 10 μm and about 800 μm, between about 50 μm and about 600 μm, between about 200 μm and about 400 μm or about 333 μm.

In one embodiment, the electrodes comprise the sensing electrode and a reference electrode, and the quartz crystal has a generally planar shape having opposed first and second surfaces respectively for contacting the sensing and reference electrodes, the sensing and reference electrodes being generally aligned in a direction along a depth of the quartz crystal.

In one embodiment, the array of sensing electrode members is arranged on an area on the quartz crystal smaller than the reference electrode. In one embodiment, the reference electrode is generally or substantially circular in shape, the array of sensing electrode members is arranged on a generally or substantially circular area having an area diameter smaller than a diameter of the reference electrode. In one embodiment, the area diameter is about one half of the diameter of the reference electrode. In one embodiment, the area and the reference electrode are substantially concentric.

In one embodiment, the electrodes comprise the sensing electrode and a reference electrode, said reference electrode being substantially circular in shape, and the sensing and reference electrodes are generally aligned in a direction along a depth of the quartz crystal. It is to be appreciated that the reference electrode is not strictly restricted to having a substantially circular shape, provided that electrode functions in the operation of the quartz crystal microbalance. In one embodiment, the reference electrode has a radius between about 0.5 mm and about 80 mm, between about 1 mm and about 30 mm, between about 2 mm and about 10 mm or about 4.25 mm. In one embodiment, the reference electrode has a depth or thickness between about 10 nm and about 800 nm, between about 50 nm and about 600 nm, between about 200 nm and about 400 nm or about 300 nm.

In one embodiment, the reference electrode and/or each said sensing electrode member independently of each other has a shape or general shape selected from the group consisting of circle, square, triangle, rectangle, pentagon, triangle, ellipse, hexagon, heptagon, octagon, nonagon and decagon. In one embodiment, the sensing electrode members has a depth or thickness between about 10 nm and about 800 nm, between about 50 nm and about 600 nm, between about 200 nm and about 400 nm or about 300 nm. In one embodiment, the sensing electrode surface portion has a shape selected from the group consisting of circle, square, triangle, rectangle, pentagon, triangle, ellipse, hexagon, heptagon, octagon, nonagon and decagon. It is to be appreciated that the shape of the sensing electrode member and the sensing electrode surface portion may include any other geometric and irregular shapes.

In one embodiment, the sensing electrode members comprise a central sensing electrode member and one or more peripheral sensing electrode members, said central sensing electrode member being for positioning at or proximal to a center of the sensing electrode surface portion, and the one or more peripheral sensing electrode members being for placement around the central sensing electrode member. In an alternative embodiment, the sensing electrode members does not comprise the central sensing electrode member, and includes the one or more peripheral sensing electrode members for placement around a center or a non-center location on the sensing electrode surface portion.

In one embodiment, the sensing electrode members comprise a central sensing electrode member and one or more peripheral sensing electrode members for placement around the central sensing electrode member, optionally wherein one or more said peripheral sensing electrode members contact or at least partially overlap with the central sensing electrode member, and optionally wherein the central sensing electrode member is sized about equal or larger than the peripheral sensing electrode members.

In one embodiment, a plurality of said peripheral sensing electrode members are arranged along one or more enclosing lines around the central sensing electrode member. It is to be appreciated that the enclosing lines are not necessarily required to be any physical line present with the quartz crystal microbalance, may be an imaginary line, which may form a regular, geometric or irregular shape. Furthermore, the peripheral sensing electrode members may be evenly or unevenly distributed along the enclosing line.

In one embodiment, the peripheral sensing electrode members are arranged along one said enclosing line around the central sensing electrode member.

In one embodiment, the central and peripheral sensing electrode members are generally or substantially circular in shape, and the peripheral sensing electrode members are for placement along a periphery of the central sensing electrode member. In one embodiment, the central sensing electrode member is larger or has a larger radius than the peripheral sensing electrode members. In one embodiment, the central sensing electrode: member has a radius between about 0.2 mm and about 5 mm, between about 0.5 mm and about 3 mm, between about 1 mm and about 2 mm or about 1.75 mm, and each said peripheral sensing electrode member independently of each other has a radius between 0.1 mm and about 3 mm, between about 0.3 mm and about 2 mm, between about 0.5 mm and about 1 mm or about 0.76 mm.

In an alternative embodiment, the central sensing electrode member is smaller or has a smaller radius than the peripheral sensing electrode members. In one embodiment, the central sensing electrode member is smaller or has a smaller radius than some, but not all, of the peripheral sensing electrode members.

In one embodiment, one or more said peripheral sensing electrode members contact or at least partially overlap with the central sensing electrode member. In one embodiment, one or more said peripheral sensing electrode members are distanced from the central sensing electrode member. In one embodiment, one or more said peripheral sensing electrode members contact or at least partially overlap with at least one other said peripheral sensing electrode member. In one embodiment, the peripheral sensing electrode members are distanced from other said peripheral sensing electrode member.

In one embodiment, the peripheral sensing electrode members are arranged along at least first and second said enclosing lines around the central sensing electrode member, the first enclosing line being interposed between the central sensing electrode member and the second enclosing line. It is to be appreciated that the peripheral sensing electrode members may be arranged in enclosing lines in addition to the first and second said enclosing lines.

In one embodiment, the central and peripheral sensing electrode members are generally or substantially circular in shape, and the peripheral sensing electrode members arranged along the first enclosing line are for placement along a periphery of the central sensing electrode member and interposed between the central sensing electrode member and the peripheral sensing electrode members arranged along the second enclosing line.

In one embodiment, the central sensing electrode member is substantially identical in size to the peripheral sensing electrode members. In one embodiment, the central and peripheral sensing electrode members have a radius between 0.1 mm and about 3 mm, between about 0.3 mm and about 2 mm, between about 0.5 mm and about 1 mm or about 0.76 mm or about 0.62 mm. In an alternative embodiment, the central sensing electrode member is larger or has a larger radius than the peripheral sensing electrode members. In an alternative embodiment, the central sensing electrode member is smaller or has a smaller radius than the peripheral sensing electrode members. In one embodiment, the central sensing electrode member is smaller or has a smaller radius than some, but not all, of the peripheral sensing electrode members.

In one embodiment, one or more said peripheral sensing electrode members arranged along the first enclosing line contact or at least partially overlap with the central sensing electrode member, and one or more said peripheral sensing electrode members arranged along the second enclosing line contact or at least partially overlap with one or more said peripheral sensing electrode members arranged along the first enclosing line. In one embodiment, one or more said peripheral sensing electrode members arranged along the first enclosing line are distanced from the central sensing electrode member, and one or more said peripheral sensing electrode members arranged along the second enclosing line are distanced from one or more said peripheral sensing electrode members arranged along the first enclosing line. In one embodiment, at least one said peripheral sensing electrode member arranged along the first enclosing line contact or partially overlap with another said peripheral sensing electrode member arranged along the first enclosing line. In one embodiment, at least one said peripheral sensing electrode member arranged along the second enclosing line contact or partially overlap with another said peripheral sensing electrode member arranged along the second enclosing line. In one embodiment, at least one said peripheral sensing electrode member arranged along the first enclosing line is distanced from another said peripheral sensing electrode member arranged along the first enclosing line. In one embodiment, at least one said peripheral sensing electrode member arranged along the second enclosing line is distanced from another said peripheral sensing electrode member arranged along the second enclosing line.

In one embodiment, the sensing electrode surface portion has a radius between 1 mm and about 5 mm, between about 2 mm and about 4 mm, between about 2.5 mm and about 3.5 mm or about 2.96 mm.

In one embodiment, the array of the sensing electrode members are arranged as shown in FIG. 12 (on the left), FIG. 13, FIG. 14 (far right) or FIG. 16.

In one embodiment, the quartz crystal microbalance is for operation with an applied voltage between about 1 V and about 100 V, between about 3 V and about 50 V, between about 5 V and about 20 V, or about 10 V. In one embodiment, the quartz crystal microbalance has a mass sensitivity greater than a quartz crystal microbalance having a pair of circular electrodes. In one embodiment, the quartz crystal microbalance has a mass sensitivity greater than 180 Hz/μg mm$^2$.

In one embodiment, the electrodes comprise gold. It is to be appreciated, however, that the electrodes may comprise any other electrode materials.

In one embodiment, the quartz crystal microbalance is for operation with a harmonic overtone, optionally where the overtone number is 3, 5, 7, 9, 11, 13 or 15. In one embodiment, the quartz crystal is an AT or SC cut quartz crystal. It is to be appreciated that the quartz crystal may be substituted by other resonators, such as langasite or gallium orthophosphate. In one embodiment, the sensing electrode is grounded. In one embodiment,

BRIEF DESCRIPTION OF THE DRAWINGS

Reference may now be had to the following detailed description taken together with the accompanying drawings in which:

FIG. 3 shows a schematic view of quartz crystal microbalance geometry in COMSOL Multiphysics (not to scale);

FIG. 4 shows, on the left, a schematic view of a 5 MHz QCM with a conventional circular electrode configuration, and, on the right, uniformity plot of total displacement across the circular electrode;

FIG. 5 shows a schematic view of a QCM with a mass loading area coverage from 10% to 90% (highlighted and not to scale) on the top electrode;

DETAILED DESCRIPTION OF THE PREFERRED EMBODIMENTS

Figure 1:
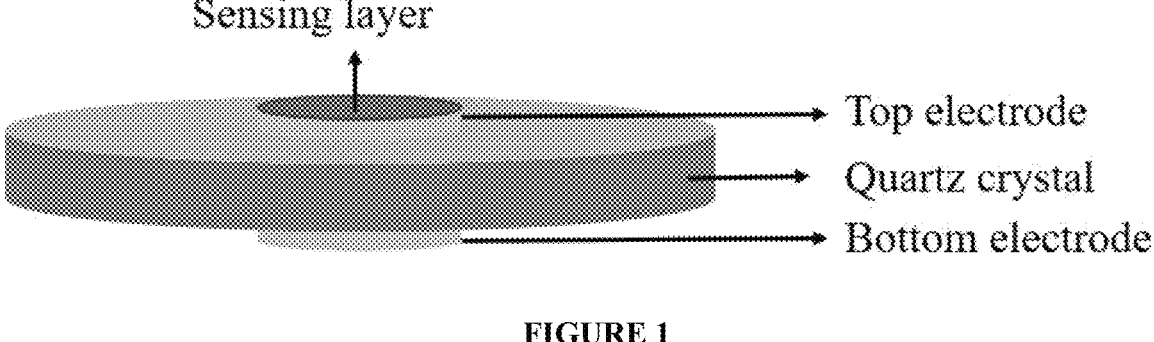
FIG. 1 shows a schematic view of a quartz crystal microbalance structure with a quartz crystal sandwiched between top and bottom electrodes.
Figure 2:
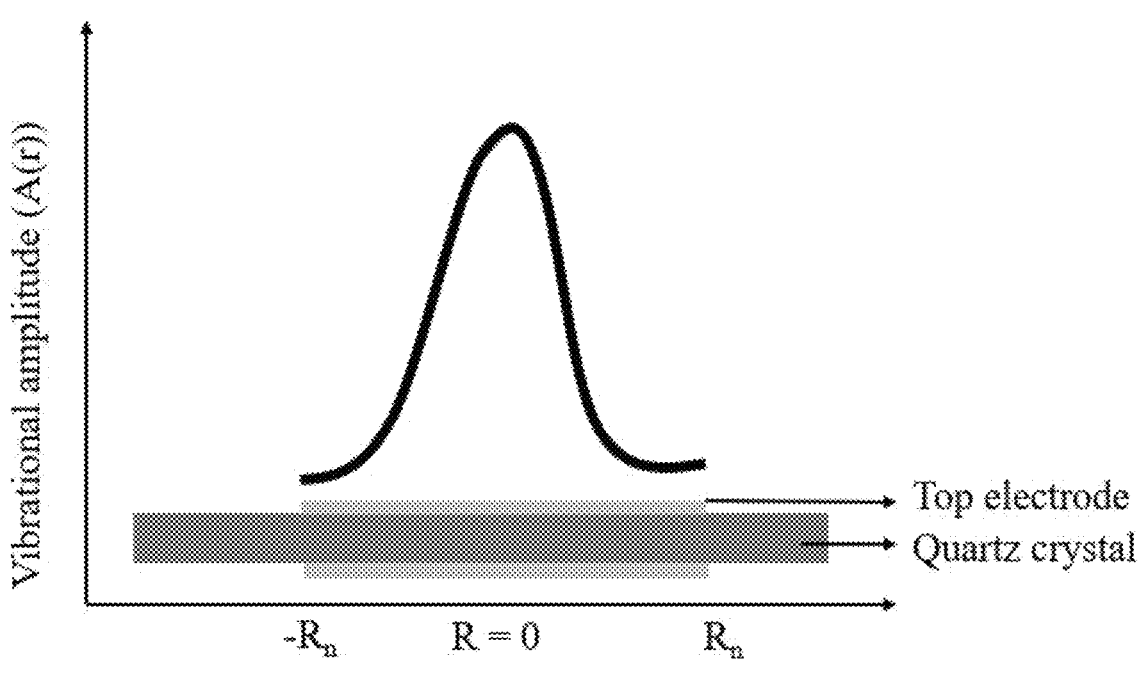
FIG. 2 shows a schematic view of variation of displacement amplitude radially across the quartz crystal due to the energy trapping effect.

It has been observed with the uniformity distribution of a QCM with conventional circular electrode that the amplitude of vibration increases at the center of the electrode (R=0) and reduces in a Gaussian pattern moving towards the edges of the active electrode area $(R_n)$, as seen in FIG. 2. This phenomenon occurs due to an effect known as the energy trapping effect. The energy trapping effect occurs as a result of internal reflection of bulk waves within the quartz area sandwiched between the electrodes. This effect governs the radial mass sensitivity distribution across the QCM electrode also referred to as the uniformity. The uniformity distribution across the QCM surface depicted in FIG. 2 indicates that there is a rise in the radial mass sensitivity in regions of accumulated energy trapping. This energy trapping effect is identified and further investigated using Finite Element Analysis simulations.

Mass Sensitivity Analysis of a QCM with Conventional Circular Electrode Configuration COMSOL Multiphysics simulation software, version 5.5, was used to build the conventional QCM geometry as illustrated in FIG. 3, and analyze its resonant frequency.

The QCM geometry was built using the parameters mentioned in Table 1 below. The geometry includes quartz crystal, top electrode and bottom electrode which are represented by the software as domains. The material properties used in the COMSOL simulations are listed in Table 2 below.

TABLE 1

| Dimensional parameters of a 5 MHz conventional QCM for mesh dependency analysis | |
| --- | --- |
| Parameter | Value |
| Quartz radius | 10 [mm] |
| Quartz thickness | 333 [μm] |
| Electrode radius | 4.25 [mm] |
| Electrode thickness | 300 [nm] |
| Voltage | 10 [V] |

TABLE 2

| Material properties utilized in COMSOL simulations | | | | | |
| --- | --- | --- | --- | --- | --- |
| No. | Material | Domain | Density | Shear (μ)/ Young's (Y) Modulus | Permittivity |
| 1. | Quartz | 1 | 2.468 g/cm³ | μ = 2.947 × 10¹¹ g/cm/s² | 1 |
| 2. | Gold | 2, 3 | 19.3 g/cm³ | Y = 70 GPa | 1 |

To investigate the mass sensitivity and the uniformity distribution across the circular electrode, the resonant frequency of a 5 MHz QCM was simulated, as seen in FIG. 4. The resonant frequency shift for an added mass per unit area of 20 $\mu g/mm^2$ was estimated to determine the mass sensitivity using equation (3).

The fundamental resonant frequency of the QCM with conventional circular electrode was found to be 4.425 MHz. The resonant frequency of the QCM for an added mass per unit area of 20 $\mu g/mm^2$ was determined as 4.341 MHz. The resonant frequency shift for the added mass was calculated as 84 kHz and the corresponding mass sensitivity was evaluated from equation (3) to be 74 Hz/$\mu g$ $mm^2$. The unequal distribution of uniformity across the circular electrode diminishes the sensing performance of the device near the electrode edges, due to the energy trapping present in the center. Hence, the energy trapping effect was further investigated by analyzing the mass loading area present on the QCM electrode.

Analysis of Effect of Mass Loading Area on Mass Sensitivity

Commercial QCM sensors consist of a sensing layer present on the sensing electrode which is responsible for analyte interaction in the form of mass loading. A change in the resonant frequency of the QCM is observed due to this mass loading effect and the corresponding area is known as the mass loading area, as seen in FIG. 5. An analysis was conducted to analyze the effect of the mass loading area of a fundamental 5 MHz QCM with a conventional circular electrode configuration. Critical design parameters, such as the radius of the quartz, quartz thickness, the radius of electrodes and electrode thickness, were maintained at a fixed value as depicted in Table 1.

In this analysis, the mass loading area was considered as a boundary layer of zero thickness present on the top electrode with an adsorption capability of 20 $\mu g/mm^2$. The mass loading area of the QCM was varied for values of 0.425 mm, 0.85 mm, 1.275 mm, 1.7 mm, 2.125 mm, 2.55 mm, 2.975 mm, 3.4 mm, 3.825 mm, and 4.25 mm, which corresponds to 10% to 100% coverage of the entire top electrode. The resonant frequency shift for an added mass per unit area of 20 $\mu g/mm^2$ was estimated to determine the mass sensitivity.

Figure 6:
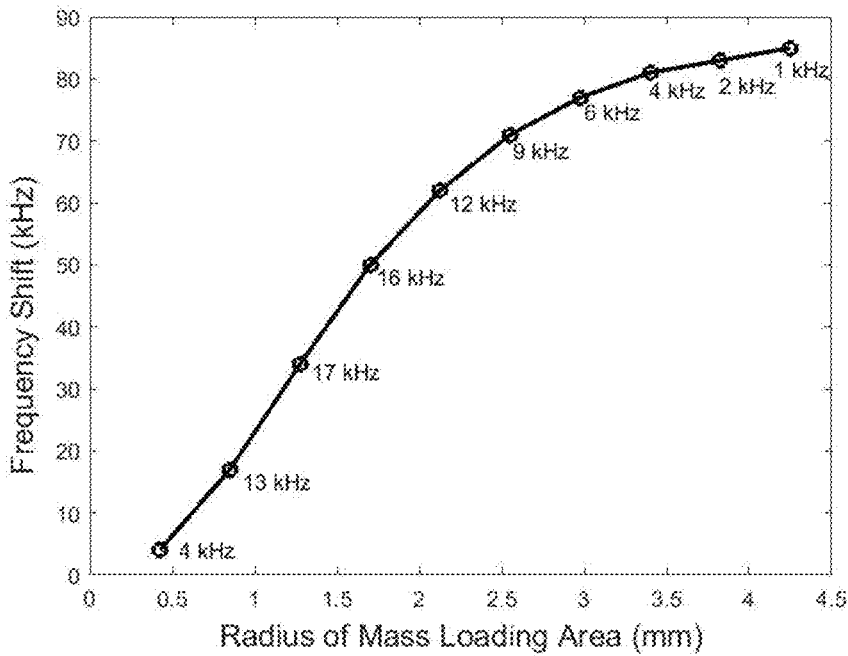
FIG. 6 shows COMSOL simulation results illustrating the frequency shift (kHz) obtained for different values of radius of mass loading area (mm) for an added mass per unit area of 20 μg/mm$^2$.
Figure 7:
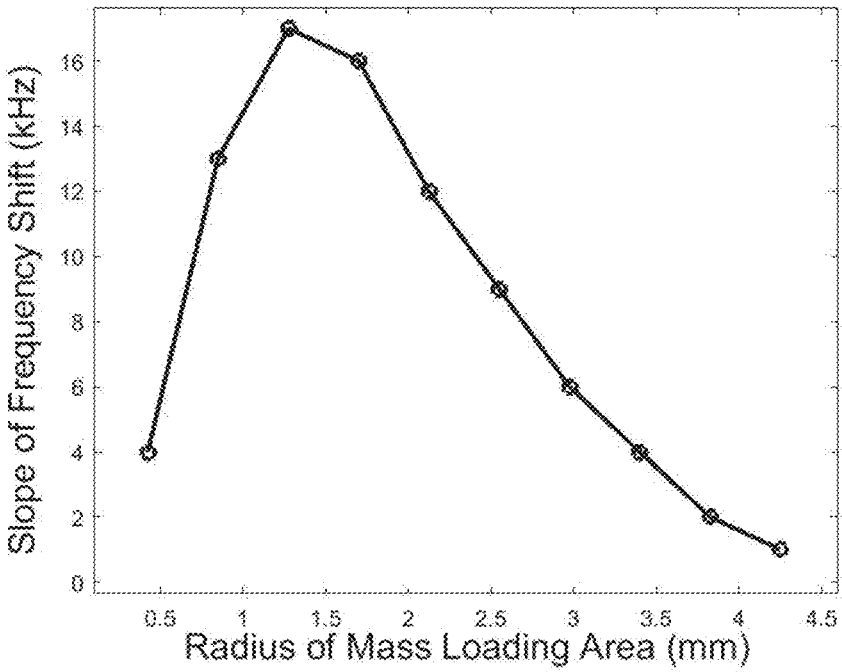
FIG. 7 shows a 2D plot illustrating the individual frequency shift values for changing radius of mass loading area as the slope of frequency shift vs. radius of mass loading area for radii values 0.425 mm, 0.85 mm, 1.275 mm, 1.7 mm, 2.125 mm, 2.5 mm, 2.975 mm, 3.4 mm, 3.825 mm, and 4.25 mm.

FIG. 6 indicated that a gradual increase in frequency shift is observed with increasing mass loading area. FIG. 7 showed that the individual frequency shift values observed on varying the mass loading area achieves a maximum at 1.275 mm after which it gradually decreased. This spike in resonant frequency shift indicated the presence of a localized energy trapping and the corresponding region can be termed as a region of opportunity. It has been appreciated that utilizing this region of opportunity for mass loading may achieve a higher resonant frequency shift for a lesser mass loading area, thereby improving mass sensitivity. The analysis results suggested that selective placement of electrodes on the QCM can improve mass sensitivity while utilizing a reduced mass loading area compared to the conventional design. The influence of the mass loading area on the device mass sensitivity for QCM devices with different electrode radii was further investigated.

Figure 8:
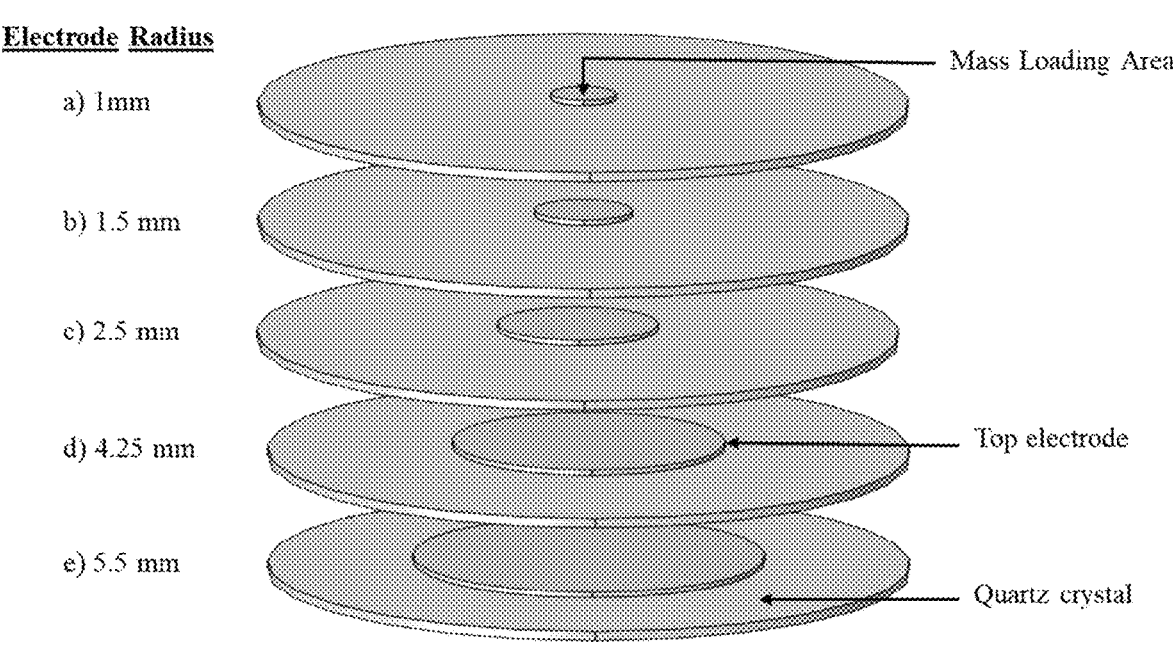
FIG. 8 shows varying of mass loading area coverage for QCM devices with electrode radii values of 1 mm, 1.5 mm, 2.5 mm, 4.25 mm, and 5.5 mm in determining the frequency shift for an added mass per unit area of 20 $\mu g/mm^2$.

In the following analysis, the influence of mass loading area on mass sensitivity was investigated for a 5 MHz QCM with different electrode radii values, as seen in FIG. 8, with a view to determine the areas of opportunity on the QCM electrode that provide the maximum resonant frequency shift for different electrode radii values.

A 5 MHz QCM with electrode radii values of 1 mm, 1.5 mm, 2.5 mm, 4.25 mm and 5.5 mm was built using the design parameters mentioned in Table 1 to determine the influence of mass loading area on the mass sensitivity. Here, the mass loading area was considered as a boundary layer of zero thickness present on the top electrode with an adsorption capability of 20 $\mu g/mm^2$. The mass loading area of the QCM was varied for values corresponding between 10% and 100% coverage of the entire top electrode.

Figure 9:
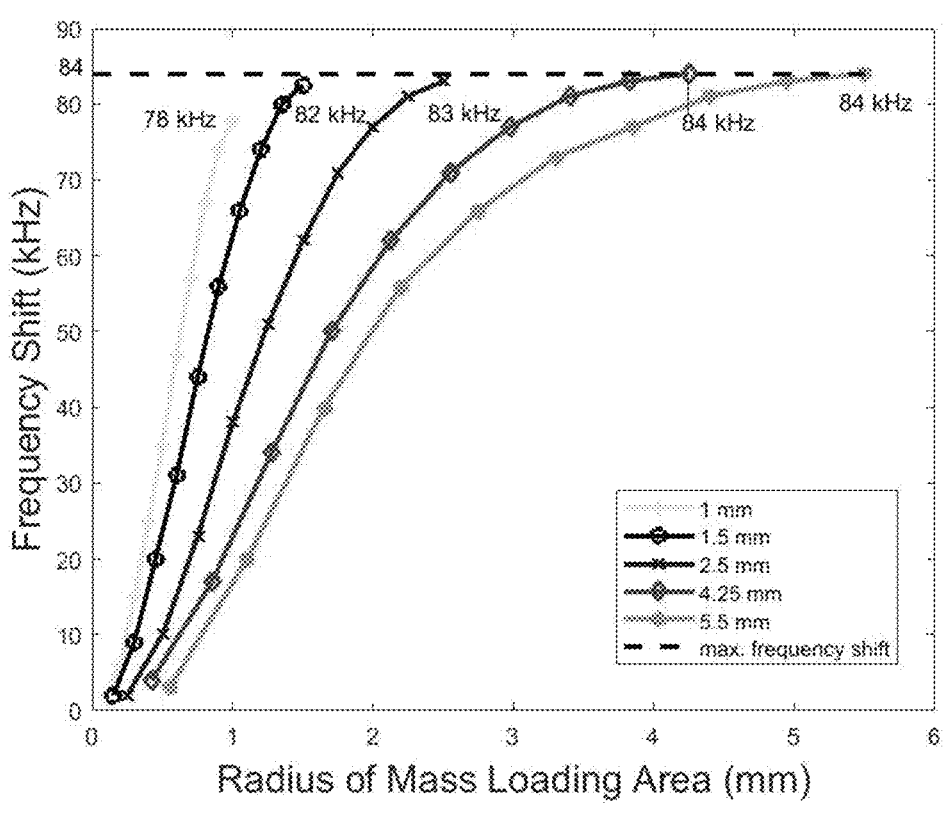
FIG. 9 shows a 2D plot illustrating the resonant frequency shift vs. radius of mass loading area (mm) for a 5 MHz QCM with different electrode radii values, namely, 1 mm, 1.5 mm, 2.5 mm, 4.25 mm and 5.5 mm.

FIG. 9 depicts a plot of the resonant frequency shift against the radius of mass loading area for different electrode radii values. The resulting frequency shift achieved by devices with a larger electrode radii was slightly greater than the frequency shift observed for devices with smaller electrode radii, on complete mass loading of the electrode. This was due to a larger electrode accommodating a greater mass loading area, which produced a higher resonant frequency shift. However, the individual frequency/shift values observed while changing the mass loading area coverage on the QCM electrode depicted a point on the electrode where the frequency shift observed is greater. This region of opportunity providing the maximum frequency shift was witnessed to be distinct for different electrode radii values. The slope of the frequency shift attained while changing the coverage of mass loading area on the electrode helped determine this higher sensitivity point.

Figure 10:
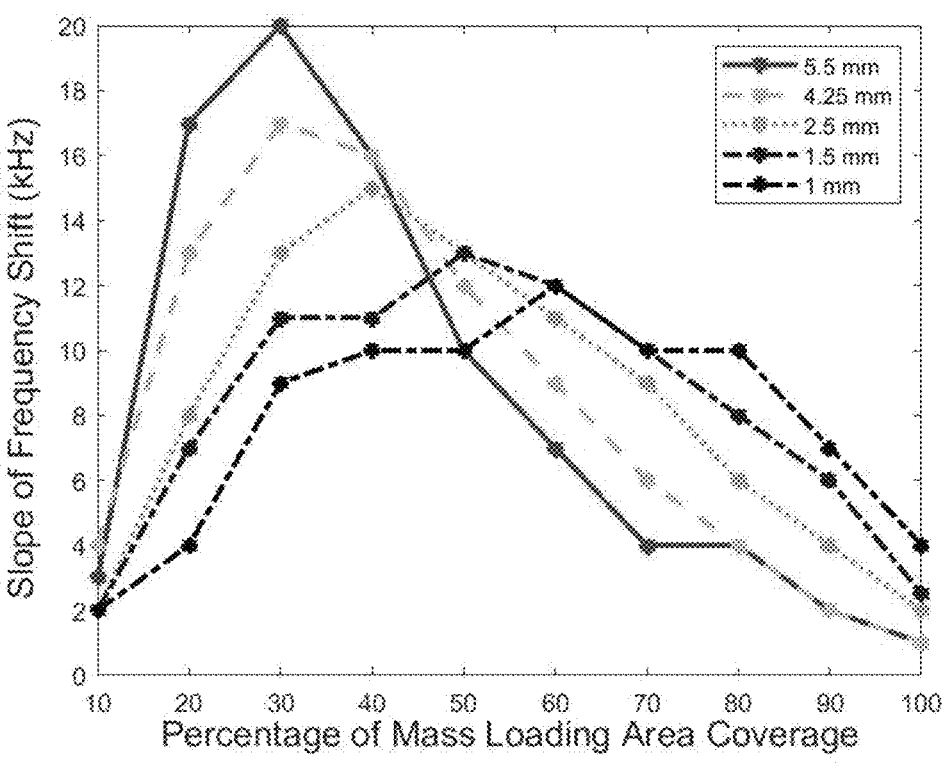
FIG. 10 shows a 2D plot illustrating the individual frequency shift values against the percentage of mass loading area as the slope of frequency shift vs. radius of mass loading area for electrode radii values 5.5 mm, 4.25 mm, 2.5 mm, 1.5 mm and 1 mm.

FIG. 10 depicts the individual frequency shift values as the slope of frequency shift produced while changing the mass loading area coverage for different electrode radii. For larger radii devices such as 5.5 mm and 4.25 mm, the point of maximum frequency shift was achieved closer to the center, at 30% coverage. On decreasing the electrode radii, the maximum frequency shift point gradually shifted rightwards towards more electrode coverage, namely 40%, 50% and 60% for electrode radii values of 2.5 mm, 1.5 mm, and 1 mm, respectively. Based on this analysis, QCM with smaller electrode radii utilized a greater mass loading area coverage to attain the maximum frequency shift point, which evenly distributed the area of opportunity on the QCM electrode. Although larger electrode radii devices attained a slightly higher total frequency shift, the maximum frequency shift point is reached at a lesser mass loading area coverage, which shortens the area of opportunity. A different approach of distributing the mass loading area by identifying and localizing the energy trapping was introduced. Based on this approach, a newly developed electrode configuration was proposed to improve the QCM mass sensitivity without affecting the uniformity distribution.

It has been appreciated that collectively utilizing smaller electrodes in the place of a larger conventional electrode may facilitate an approach to improve mass sensitivity of the device by capitalizing the areas of opportunity on the QCM surface, while also ensuring a higher mass sensitivity. Employing this concept, electrode configurations of the QCM were developed based on distribution of the mass loading area to improve mass sensitivity.

Figure 11:
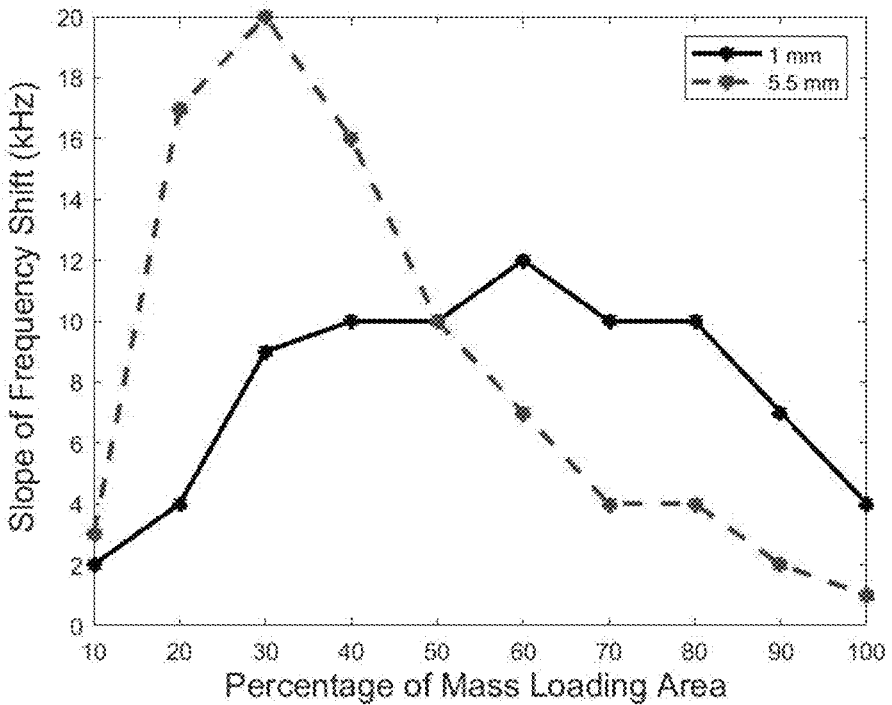
FIG. 11 shows a 2D plot illustrating the individual frequency shift values against the percentage of mass loading area as the slope of frequency shift vs. percentage of mass loading area for electrode radii values 5.5 mm and 1 mm.

The outcome of the investigation on mass loading area involving a 5 MHz QCM with an electrode radius of 5.5 mm and 1 mm was considered. As seen in FIG. 11, the maximum frequency shift point for an electrode radius of 5.5 mm was achieved at 30% of mass loading area coverage, which corresponds to an approximate mass loading area of 28 $mm^2$, hence the electrode radius is fixed at 2.96 mm. Similarly for an electrode radius of 1 mm, the maximum frequency shift point was achieved closer to 60% of mass loading area coverage. Hence an electrode radius of 0.76 mm was considered for the smaller electrodes to maximize the mass loading area coverage.

Figure 12:
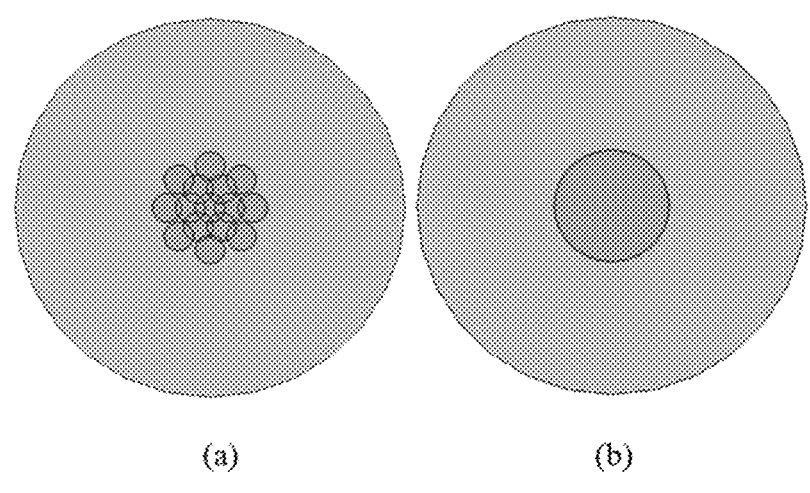
FIG. 12 shows, on the left, a schematic view of a 5 MHz QCM with Distribution of Area for Improving mass Sensitivity (DAIS) electrode configuration of outer radius of 2.96 mm comprising several smaller circular electrodes of radius 0.76 mm in accordance with a preferred non-limiting embodiment of the present invention, and, on the right, a 5 MHz QCM with a conventional circular electrode configuration of electrode radius 2.96 mm.

FIG. 12 shows a 5 MHz QCM with the DAIS electrode configuration in accordance with a preferred, non-limiting embodiment of the present invention, and built by collectively utilizing smaller electrodes in place of one large conventional circular electrode, with a view to improve device mass sensitivity. For comparison, a 5 MHz QCM with a conventional circular electrode of radius 2.96 mm was built.

Table 3 below identifies the parameters utilized to design the 5 MHz QCM used in this analysis. The resonant frequency and frequency shift were determined for an added mass per unit area of 20 $\mu g/mm^2$ to evaluate the mass sensitivity.

TABLE 3

Design Parameters of a QCM with novel
DAIS electrode configuration

| Parameter | Value |
|---|---|
| Quartz radius | 10 [mm] |
| Quartz thickness | 333 [μm] |
| Top outer electrode and bottom electrode radius | 2.96 [mm] |
| Electrode thickness | 300 [nm] |
| voltage | 10 [V] |

Table 4 below presents comparison of the resonant frequency shift and the mass sensitivities of the QCM with DAIS electrode and circular electrode configurations. The circular electrode configuration attained a higher frequency shift of 83.5 kHz and a mass sensitivity of 151 $Hz/\mu g\ mm^2$. The DAIS electrode configuration achieved a comparable frequency shift of 82.5 kHz and exhibited a higher mass sensitivity of 185 $Hz/\mu g\ mm^2$ while possessing a noticeably lesser mass loading area.

TABLE 4

Comparison of resonant frequency shift and mass sensitivity
of the DAIS electrode configuration and the conventional
circular electrode configuration.

| | DAIS electrode - design 1 | Conventional Circular Electrode |
|---|---|---|
| Mass loading area | 22.21 mm² | 27.52 mm² |
| Frequency shift | $F_1$ = 4.4565 MHz<br>$F_2$ = 4.374 MHz<br>Δf = 82.5 kHz | $F_1$ = 4.4445 MHz<br>$F_2$ = 4.361 MHzΔf = 83.5 kHz |
| Mass Sensitivity | 182 Hz/μg mm² | 151 Hz/μg mm² |

Figure 13:
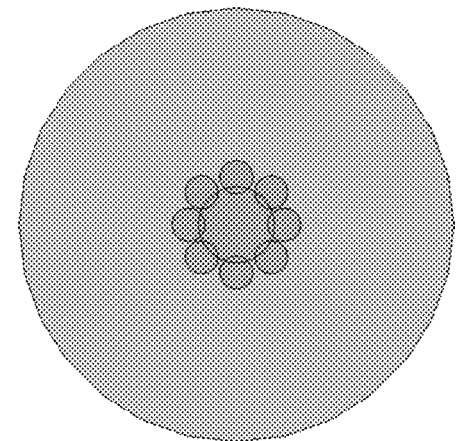
FIG. 13 shows a schematic view of a 5 MHz QCM with DAIS—design 2 electrode configuration of outer radius of 2.96 mm comprising a central circular electrode radius of 1.75 mm surrounded by smaller circular electrodes of radius 0.76 mm in accordance with a preferred non-limiting embodiment of the present invention.

The central electrode area of the DAIS—design 1 consisting of 7 circular electrodes of radius 0.76 mm was replaced by a single circular electrode of radius 1.75 mm in the DAIS—design 2, as seen in FIG. 13. Other design parameters and outer electrode radius were kept unchanged as mentioned in Table 3. The DAIS—design 1 and design 2 were compared by determining the resonant frequency and frequency shift for an added mass per unit area of 20 $\mu g/mm^2$ to evaluate the mass sensitivity.

TABLE 5

Comparison of resonant frequency shift and mass sensitivity
of the DAIS electrode configurations design 1 and design 2

| | DAIS electrode - design 1 | DAIS electrode - design 2 |
|---|---|---|
| Mass loading area | 22.21 mm² | 22.26 mm² |
| Frequency shift | $F_1$ = 4.4565 MHz<br>$F_2$ = 4.374 MHz<br>Δf = 82.5 kHz | $F_1$ = 4.455 MHz<br>$F_2$ = 4.3725 MHz<br>Δf = 82.5 kHz |
| Mass Sensitivity | 182 Hz/μg mm² | 185 Hz/μg mm² |

The DAIS electrode—design 1 and design 2 attained similar frequency shift and comparable mass sensitivity values. This indicates that the central overlapping electrodes in the DAIS configuration can be replaced by a singular electrode of equivalent mass loading area, which corroborates the presence of the inherent energy trapping.

To investigate the effect of surrounding electrodes, the DAIS—design 3 was designed, which utilized smaller surrounding electrodes of radius 0.62 mm, while the central electrode radius was fixed at 1.75 mm, and the design parameters remain unchanged as per Table 3. For comparison, a 5 MHz QCM with a ring-dot electrode configuration of similar mass loading area and equal outer electrode radius was built for comparison. The radius of the central circular electrodes of the ring-dot electrode configuration and the DAIS electrode configuration were kept approximately equal to 1.75 mm. The area of the ring electrode in the ring-dot configuration and the total area of the surrounding circular electrodes of the DAIS-2 configuration were approximately equal to 12 mm² (±3% difference). The gap length between the ring and dot electrodes in the ring-dot electrode configuration was equal to the overlap length between the central circular electrode and the smaller surrounding electrodes in the DAIS configuration approximately equal to 0.4 mm.

Figure 14:
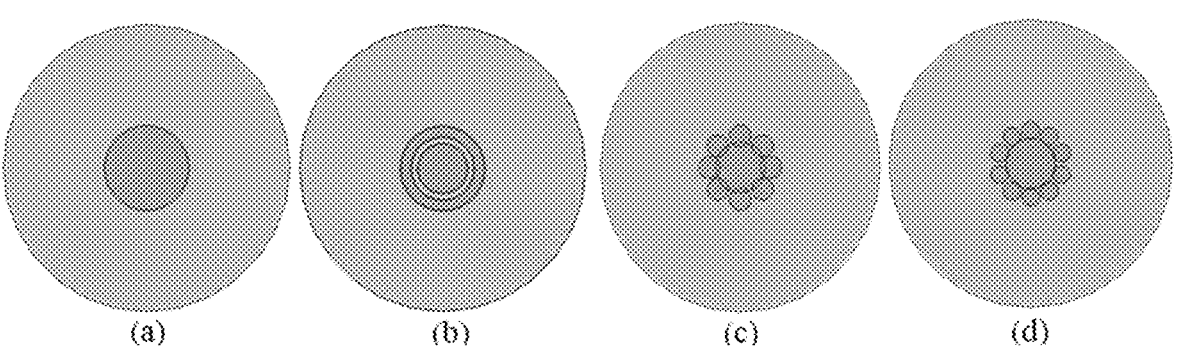
FIG. 14 shows, from the far left, a schematic view of (a) a 5 MHz QCM with a conventional circular electrode, (b) a QCM with a ring-dot electrode configuration of electrode radius 2.96 mm, (c) a QCM with DAIS electrode configuration—design 2 in accordance with a preferred non-limiting embodiment of the present invention, and (d) a QCM with DAIS electrode configuration-design 3 in accordance with a preferred non-limiting embodiment of the present invention.

Different electrode configurations shown in FIG. 14 were compared by determining the frequency shift for an added mass per unit area of 20 $\mu g/mm^2$ to evaluate the mass sensitivity and comparing the uniformity distribution. To estimate the mass sensitivity distribution across the QCM electrode, the area under the uniformity curve was evaluated (using the trapezoid rule).

TABLE 6

Comparison of mass sensitivity and area under the uniformity curve for a 5 MHz QCM with circular
electrode, ring-dot electrode configuration and the novel DAIS electrode configuration

| | Circular Electrode | Ring-Dot Electrode | DAIS - design 2 | DAIS - design 3 |
|---|---|---|---|---|
| Mass loading area | 27.52 mm² | 21.8 mm² | 22.26 mm² | 21.533 mm² |

TABLE 6-continued

Comparison of mass sensitivity and area under the uniformity curve for a 5 MHz QCM with circular electrode, ring-dot electrode configuration and the novel DAIS electrode configuration

| | Circular Electrode | Ring-Dot Electrode | DAIS - design 2 | DAIS - design 3 |
|---|---|---|---|---|
| Mass Sensitivity | 151 Hz/μg mm² | 180 Hz/μg mm² | 185 Hz/μg mm² | 190 Hz/μg mm² |
| Area under curve (uniformity area) | 96 mm² | 80 mm² | 91 mm² | 82 mm² |

Figure 15:
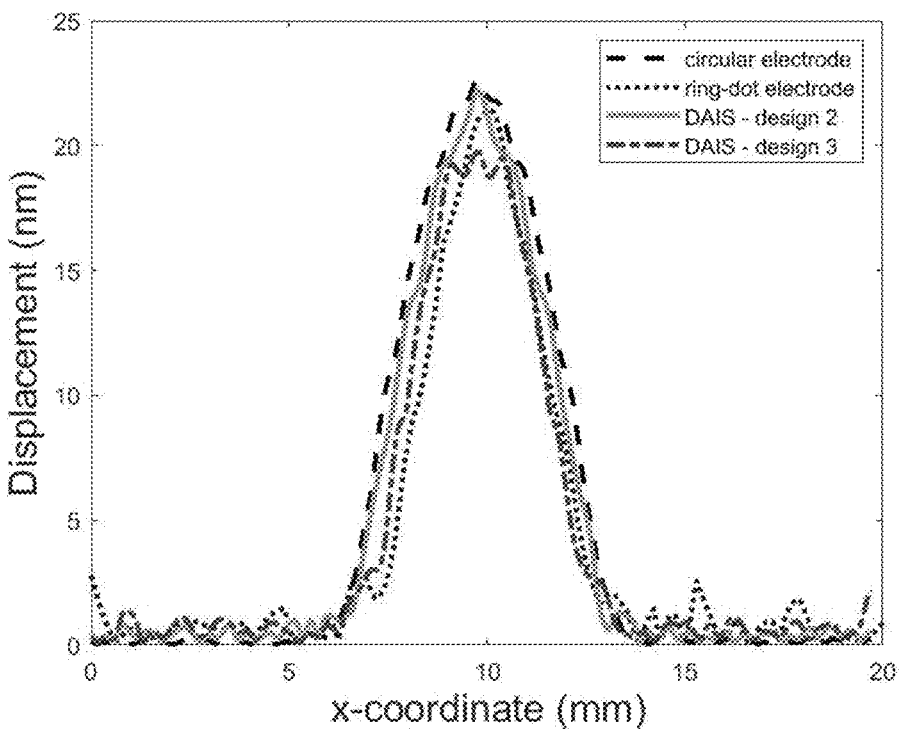
FIG. 15 shows a 2D plot of amplitude of displacement across the QCM surface comparing the uniformity distribution of QCM with a conventional circular electrode, a ring-dot electrode and DAIS electrode design 2 and design 3 comprising an outer electrode radius of 2.96 mm.

FIG. 15 shows the uniformity distribution of the conventional circular electrode, ring-dot electrode, and the DAIS electrode-design 2, and 3 with equal outer electrode radius of 2.96 mm. The conventional circular electrode configuration attained a higher displacement amplitude of approximately 23 nm at the center, however the displacement amplitude drops to the range of 10-15 nm in the radial direction near the electrode edges. On estimating the area under curve, the uniformity area of the circular electrode configuration was found to be 96 mm².

The ring-dot electrode configuration exhibited a poor uniformity distribution, despite comprising a distributed electrode setup. This is due to the large dot electrode and a comparatively smaller ring electrode area which diminishes the uniformity distribution. The displacement amplitude at the center was found to be nearly 21 nm, which was seen to reduce to the range of 5-10 nm near the electrode edges, thereby resulting in a narrower uniformity distribution. The uniformity area of the ring-dot electrode configuration was evaluated as 80 mm².

The uniformity distribution of the DAIS—design 2 was found to be similar to the conventional circular electrode configuration, while possessing lesser mass loading area. It attained a displacement amplitude of approximately 23 nm at the center, which was observed to decrease radially to the range of 10-15 nm near the electrode edges. The uniformity area of the DAIS—design 2 was estimated as 91 mm². Hence, for a 19% lesser mass loading area, there was only a 5% decrease in the uniformity distribution of the DAIS—design 2 in comparison with the conventional circular electrode. Table 6 shows that the DAIS—design 2 also attained a comparable frequency shift, and a higher mass sensitivity of 185 Hz/μg mm² compared to the conventional circular electrode configuration.

The uniformity area of the DAIS—design 3 was estimated as 82 mm². Hence, for a 22% lesser mass loading area, there was only a 14% decrease in the uniformity distribution of the DAIS—design 3, in comparison with the conventional circular electrode. The DAIS—design 3 also attained a comparable frequency shift, and a higher mass sensitivity of 190 Hz/μg mm² in contrast with the conventional circular electrode configuration.

The analysis results suggests that QCM electrodes designed using DAIS approach provided a competent sensing performance by capitalizing on the inherent energy tapping effect. Their ability to attain a higher mass sensitivity and retain the uniformity, while utilizing lesser mass loading area may serve as a proof of principle for sensing applications. Investigating the DAIS approach to build a plausibly optimized QCM electrode configuration could further improve the mass sensitivity of the device for a lesser mass loading area, thereby enabling DAIS approach for fabricating potential candidates for sensing in environments with low analyte concentration.

Figure 16:
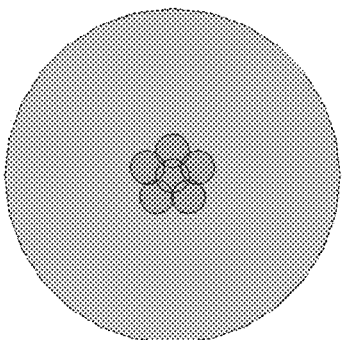
FIG. 16 shows a 5 MHz quartz crystal microbalance with an outer radius of 2.5 mm in accordance with a preferred non-limiting embodiment of the present invention.
Figure 17:
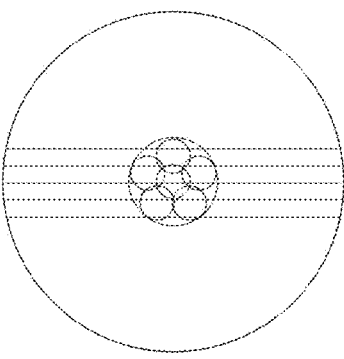
FIG. 17 shows a COMSOL 3D cut line of the 5 MHz quartz crystal microbalance seen in FIG. 16.
Figure 18:
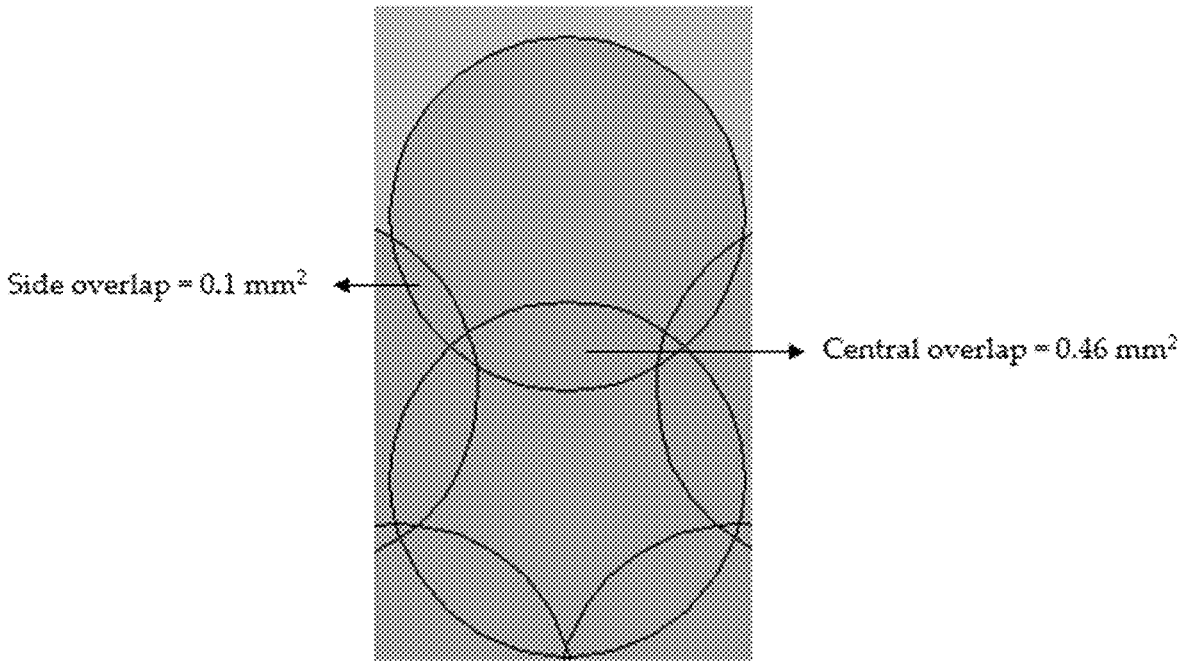
FIG. 18 shows a partial magnified view of the 5 MHz quartz crystal microbalance seen in FIG. 16 with identification of overlap areas.

In yet another experimental study, another 5 MHz quartz crystal microbalance was considered with the electrode configuration seen in FIGS. 16 to 18 with an added mass of 20 μg/mm² and the parameters set below:

| Parameter | Value |
|---|---|
| Oscillator radius | 10 [mm] |
| Oscillator thickness | 333 [μm] |
| Top outer electrode and bottom electrode radius | 2.5 [mm] |
| Electrode thickness | 300 [nm] |
| Alternating voltage | 10 [V] |

The resonance frequency shift for an added mass was determined to be as provided below:

| | DAIS - design 0 | 2.5 mm Conventional Circular Electrode QCM |
|---|---|---|
| Mass loading area | 16.1 mm² | 19.634 mm² |
| Electrode radius | 1 mm × 6 outer radius = 2.5 mm | 2.5 mm |
| Frequency shift (Δf) | $F_1$ = 4.4625 MHz $F_2$ = 4.373 MHz Δf = 89.5 kHz | $F_1$ = 4.455 MHz $F_2$ = 4.372 MHz Δf = 83 kHz |

Figure 19:
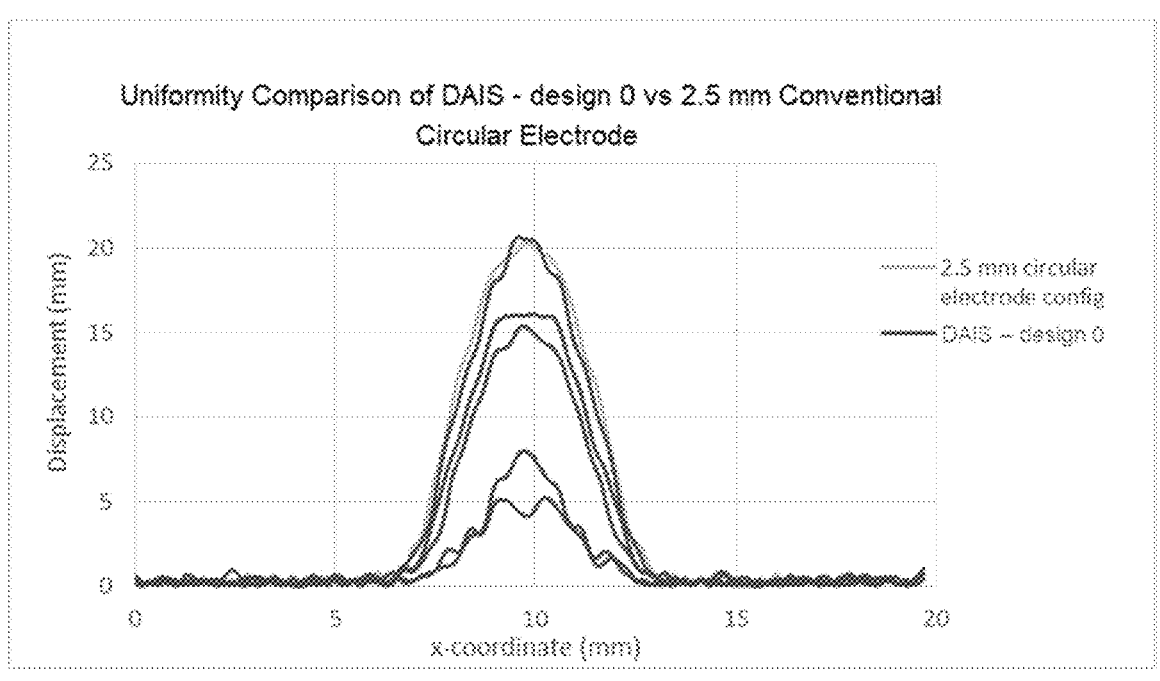
FIG. 19 shows a 2D plot of amplitude of displacement across the QCM surface comparing the uniformity distribution of QCM with a conventional circular electrode and DAIS electrode design 0 comprising an outer electrode radius of 2.5 mm.
Figures 20, 21:
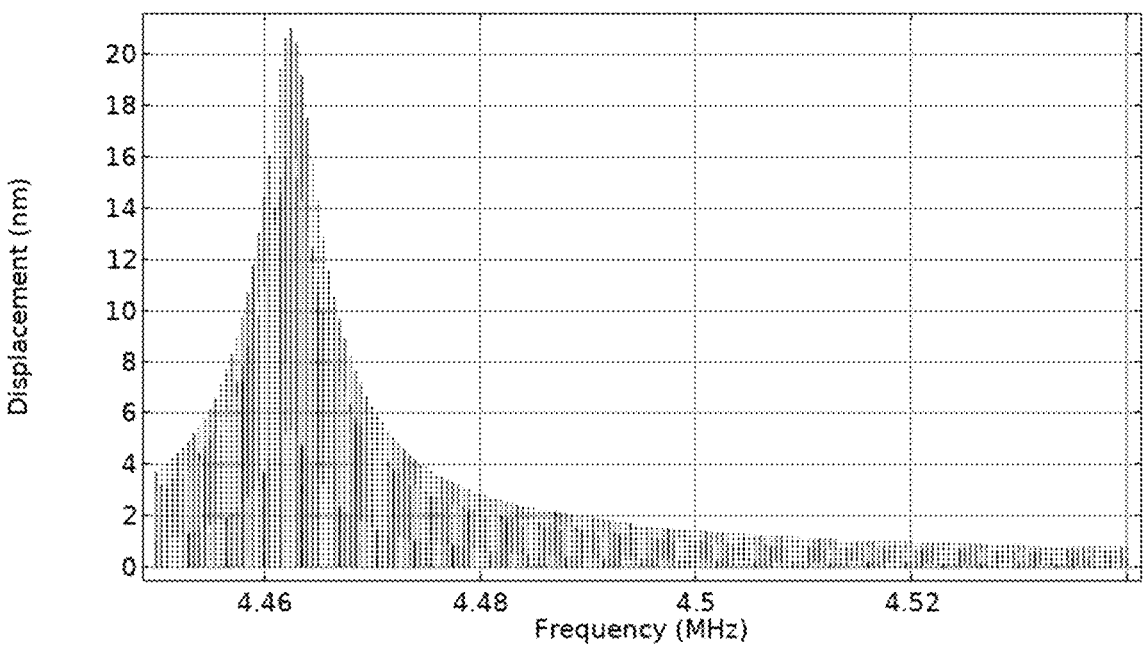
FIG. 20 shows a graph illustrating the fundamental resonant frequency of DAIS—design 0.
FIG. 21 shows a graph illustrating resonant frequency for added mass per unit area of 20 $\mu g/mm^2$.

The above suggested that the quartz crystal microbalance attained a higher resonant frequency shift and thus mass sensitivity for the same added mass compared to conventional circular electrode configuration, and the uniformity distribution achieved by the microbalance was comparable to conventional design, as may be illustrated by FIG. 19. FIGS. 20 and 21 respectively further illustrate fundamental resonant frequency and resonant frequency for added mass per unit area of 20 μg/mm² for DAIS—design 0.

Figure 22:
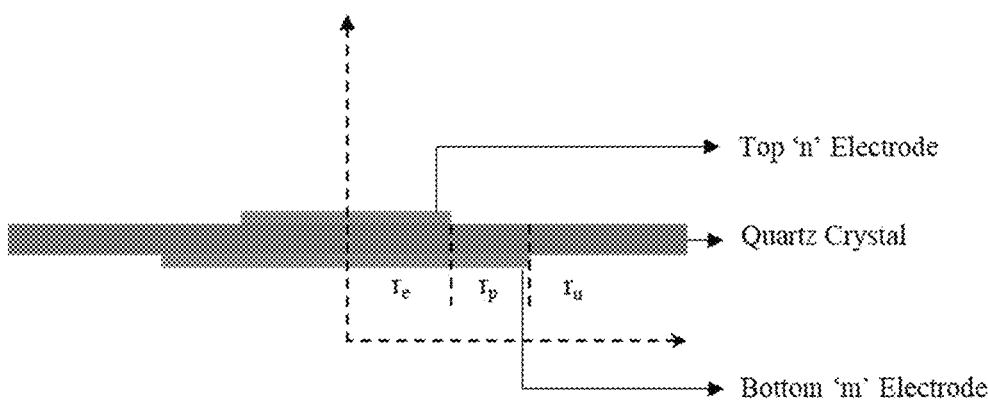
FIG. 22 shows a schematic view of a quartz crystal microbalance structure with a quartz crystal sandwiched between top and bottom electrodes with the n-m electrode configuration providing electroded, partially electroded and unelectroded regions.

It has been recognized that a modification to the conventional circular electrode configuration, or the n-m electrode configuration, may permit studies on the radial dependence and effect of unequal electrode radii on the QCM mass sensitivity. The QCM with n-m electrode configuration illustrated as seen in FIG. 22 comprises unidentical top 'n' and bottom 'm' electrodes, wherein "n" and "m" represent the diameter of the top electrode and bottom electrode, respectively. In this configuration, the quartz surface is divided into three distinct regions; $r_e$, $r_p$ and $r_q$ which represent electroded, partially electroded and unelectroded regions respectively. On analyzing the influence of changing individual electrode diameters on mass sensitivity, it was found that a higher mass sensitivity point was attained when the diameter of the n electrode is close to half of the diameter of the m electrode, in comparison with the circular electrode structure. This further depicted the contribution of the partially electroded and unelectroded region to the QCM mass sensitivity and portrayed the presence of localized energy trapping in the central electroded region of the quartz.

Analogous to the above, the DAIS may involve localizing the energy trapping effect by identifying the regions on the QCM electrode which provides a higher resonant frequency shift due to mass loading. Positioning the mass loading area on these regions may provide a means to capture the energy trapping effect and consequently enhance the mass sensitivity of the QCM while utilizing lesser mass loading area. Hence, an analysis was conducted to infer the effect of unequal radius of the novel DAIS electrode configuration and bottom circular electrode configuration to investigate the uniformity distribution and the mass sensitivity of the QCM. Provided below is a table showing dimensional parameters of 5 MHz DAIS electrode QCM for mass sensitivity analysis:

| Parameter | Value |
| --- | --- |
| Quartz radius | 10 mm |
| Quartz thickness | 333 μm |
| Top DAIS electrode radius | 2.96 mm |
| Bottom electrode radius | 2.96, 5.92, 8.88 mm |
| Electrode thickness | 300 nm |

Figure 23:
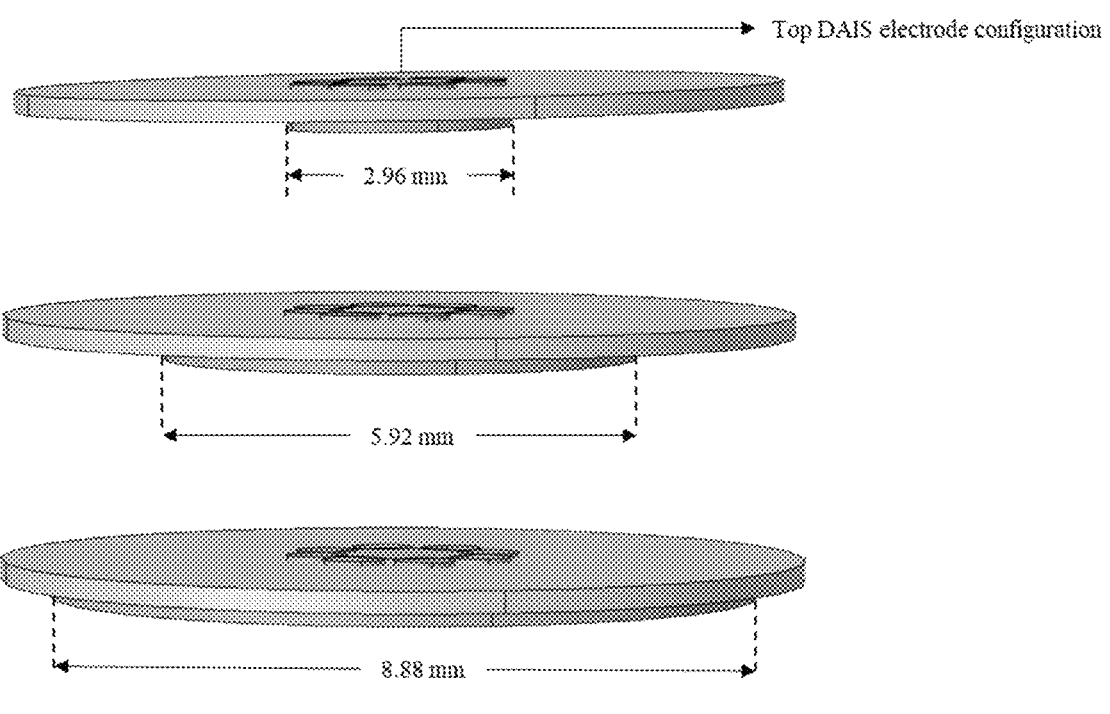
FIG. 23 shows varying of electrode radii in the mass sensitivity analysis of QCM with n-m electrode configuration with n, or top, electrode radius of 2.96 mm and m, or bottom, electrode radii of 2.96 mm, 5.92 mm and 8.88 mm.

In this analysis, as seen in FIG. 23, the top electrode radius of the novel DAIS electrode configuration was kept constant while the bottom electrode radius was varied for the values of 2.96 mm, 5.92 mm, and 8.8 mm respectively. The table directly above depicts the parameters utilized to design the 5 MHz QCM with DAIS electrode configuration investigated in this analysis. The uniformity distribution and the resonant frequency shift for an added mass per unit area of 20 μg/mm² was utilized to simulate the mass loading effect on the QCM mass loading area.

It has been appreciated that the fundamental resonant frequency of the QCM may be enhanced by operating in higher harmonic overtones to attain enhanced mass sensitivity without altering the quartz thickness. In this overtone mode, the Sauerbrey's equation is modified as:

$$\Delta f = -\frac{2nf_o^2}{A\sqrt{\rho_q\mu_q}}\Delta m \tag{5}$$

where 'n' represents the overtone number (n=1, 3, 5, 7 . . . ). When operated at higher resonant frequencies, the frequency shift measured and observed is higher, thereby depicting a potentially higher mass sensitivity in comparison with the fundamental mode. However, while operating at higher frequencies, the stability of the quartz crystal was found to deteriorate due to introduction of noise and vibrational instability which in turn affects the quality factor. Furthermore, the radial mass sensitivity across the conventional QCM is found to converge closer to the centre in higher harmonic overtones, thereby reducing the uniformity area. This in turn results in an unequal and diminished sensing performance across the QCM electrode and near to the electrode edges.

By localizing the energy trapping effect across the quartz surface, the DAIS electrode configuration was found to possibly permit enhanced mass sensitivity while retaining the radial mass sensitivity distribution, thereby not diminishing the uniformity area. Hence, in an analysis, the QCM with DAIS electrode configuration with an outer electrode radius of 2.96 mm was excited at harmonic overtones of n=1,3,5 to investigate the influence on mass sensitivity and the radial mass sensitivity distribution. Furthermore, the analysis results were contrasted with a QCM with conventional circular electrode configuration operating in similar overtone modes.

Figure 24:
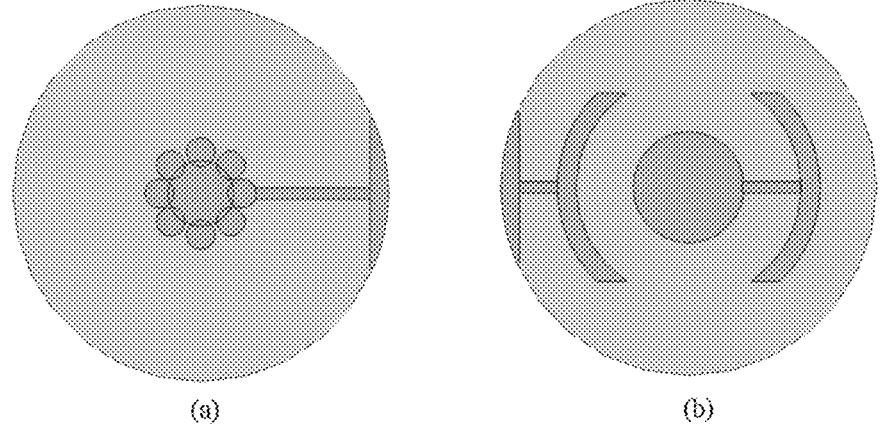
FIG. 24 shows a schematic view of a QCM with DAIS electrode configuration with wrap around electrode configuration, where a) on the left shows the top electrode, and b) on the right shows the bottom electrode.

To fabricate the QCM with novel DAIS electrode configuration, blank polished AT-cut quartz crystals with an operating frequency of 5 MHz may be used with fabrication steps involving microfabrication techniques for developing conventional QCM sensors, such as using a shadow mask to form the electrode pattern, followed by electrode deposition using gold as the material. As seen in FIG. 24, the wrap-around electrode configuration may be used to facilitate measurements using pogo-pin connectors when placed in the QCM holder. the IMM200 monitoring system may permit recording of the resonant frequency and frequency shift of the QCM, which utilizes an oscillator circuit to continuously excite the QCM and retrieve the resonant frequency.

While the invention has been described with reference to preferred embodiments, the invention is not or intended by the applicant to be so limited. A person skilled in the art would readily recognize and incorporate various modifications, additional elements and/or different combinations of the described components consistent with the scope of the invention as described herein.

We claim:

1. A quartz crystal microbalance comprising a pair of electrodes and a quartz crystal disposed therebetween, one said electrode operable as a sensing electrode for interacting with an analyte, wherein said sensing electrode comprises an array of sensing electrode members arranged on the quartz crystal, and wherein the electrodes comprise the sensing electrode and a reference electrode, and the quartz crystal has a generally planar shape having opposed first and second surfaces respectively for contacting the sensing and reference electrodes, the sensing and reference electrodes being generally aligned in a direction along a depth of the quartz crystal.

2. The quartz crystal microbalance of claim 1, wherein the array of sensing electrode members is arranged on an area on the quartz crystal smaller than the reference electrode.

3. A quartz crystal microbalance comprising a pair of electrodes and a quartz crystal disposed therebetween, one said electrode operable as a sensing electrode for interacting with an analyte, wherein said sensing electrode comprises an array of sensing electrode members arranged on the quartz crystal, and wherein the sensing electrode members comprise a central sensing electrode member and one or more peripheral sensing electrode members for placement around the central sensing electrode member, optionally wherein one or more said peripheral sensing electrode members contact or at least partially overlap with the central sensing electrode member, and optionally wherein the central sensing electrode member is sized about equal or larger than the peripheral sensing electrode members.

4. The quartz crystal microbalance of claim 3, wherein the central and peripheral sensing electrode members are generally circular in shape, and the peripheral sensing electrode members are for placement along a periphery of the central sensing electrode member.

5. The quartz crystal microbalance of claim 3, wherein a plurality of said peripheral sensing electrode members are arranged along one or more enclosing lines around the central sensing electrode member.

6. The quartz crystal microbalance of claim 5, wherein the peripheral sensing electrode members are arranged along at least first and second said enclosing lines around the central sensing electrode member, the first enclosing line being interposed between the central sensing electrode member and the second enclosing line.

7. The quartz crystal microbalance of claim 6, wherein the central and peripheral sensing electrode members are generally circular in shape, and the peripheral sensing electrode members arranged along the first enclosing line are for placement along a periphery of the central sensing electrode member and interposed between the central sensing electrode member and the peripheral sensing electrode members arranged along the second enclosing line.

8. The quartz crystal microbalance of claim 6, wherein one or more said peripheral sensing electrode members arranged along the first enclosing line contact or at least partially overlap with the central sensing electrode member, and one or more said peripheral sensing electrode members arranged along the second enclosing line contact or at least partially overlap with one or more said peripheral sensing electrode members arranged along the first enclosing line.

9. A quartz crystal microbalance comprising sensing and reference electrodes and a generally planar quartz crystal having opposed first and second surfaces respectively for contacting the sensing and reference electrodes, the sensing electrode being for interacting with an analyte, and the sensing and reference electrodes being generally aligned in a direction along a depth of the quartz crystal, wherein the sensing electrode comprises an array of sensing electrode members arranged on the quartz crystal, and wherein the sensing electrode members comprise a central sensing electrode member and one or more peripheral sensing electrode members for placement around the central sensing electrode member.

10. The quartz crystal microbalance of claim 9, wherein the quartz crystal has a generally discoid shape, and the sensing and reference electrodes are located at or proximal to a center of the quartz crystal.

11. The quartz crystal microbalance of claim 9, wherein the reference electrode and each said sensing electrode member independently of each other has a shape selected from the group consisting of circle, square, triangle, rectangle, pentagon, triangle, ellipse, hexagon, heptagon, octagon, nonagon and decagon.

12. The quartz crystal microbalance of claim 9, wherein the array of sensing electrode members is arranged on an area on the quartz crystal smaller than the reference electrode.

13. The quartz crystal microbalance of claim 9, wherein one or more said peripheral sensing electrode members contact or at least partially overlap with the central sensing electrode member, or wherein the central sensing electrode member is sized about equal or larger than the peripheral sensing electrode members.

14. The quartz crystal microbalance of claim 9, wherein the central and peripheral sensing electrode members are generally circular in shape, and the peripheral sensing electrode members are for placement along a periphery of the central sensing electrode member.

15. The quartz crystal microbalance of claim 9, wherein a plurality of said peripheral sensing electrode members are arranged along one or more enclosing lines around the central sensing electrode member.

16. The quartz crystal microbalance of claim 15, wherein the peripheral sensing electrode members are arranged along at least first and second said enclosing lines around the central sensing electrode member, the first enclosing line being interposed between the central sensing electrode member and the second enclosing line.

17. The quartz crystal microbalance of claim 16, wherein the central and peripheral sensing electrode members are generally circular in shape, and the peripheral sensing electrode members arranged along the first enclosing line are for placement along a periphery of the central sensing electrode member and interposed between the central sensing electrode member and the peripheral sensing electrode members arranged along the second enclosing line.

18. The quartz crystal microbalance of claim 16, wherein one or more said peripheral sensing electrode members arranged along the first enclosing line contact or at least partially overlap with the central sensing electrode member, and one or more said peripheral sensing electrode members arranged along the second enclosing line contact or at least partially overlap with one or more said peripheral sensing electrode members arranged along the first enclosing line.

19. The quartz crystal microbalance of claim 9, wherein the electrodes comprise gold, or wherein the quartz crystal microbalance is for operation with a harmonic overtone.

* * * * *